United States Patent

[11] 3,602,995

| [72] | Inventor | Daniel Barron<br>9326 Edmonston Road, Greenbelt, Md. 20770 |
|---|---|---|
| [21] | Appl. No. | 859,656 |
| [22] | Filed | Sept. 22, 1969 |
| [45] | Patented | Sept. 7, 1971 |

[54] RADAR PROPAGATION RAY PLOTTER
1 Claim, 3 Drawing Figs.

[52] U.S. Cl. .................................................. 33/1 C, 235/61 R, 235/89 R
[51] Int. Cl. ..................................................... B43l 5/00
[50] Field of Search............................................ 33/1 C, 1 R, 75 R; 235/89 R, 61 R

[56] References Cited
UNITED STATES PATENTS

| 3,388,474 | 6/1968 | Rosenvold et al. ............ | 33/1 C |
| 3,423,836 | 1/1969 | Barron ........................ | 33/1 R |

Primary Examiner—William D. Martin, Jr.
Attorneys—R. S. Sciascia, Arthur L. Branning, R. J. Erickson and M. L. Crane ABSTRACT: This invention is directed to the structure and use of a template for plotting a family of radar rays in the atmosphere in order to determine the zones of high probability of detection of airborne targets such as missiles, satellites and other aircraft. The template has curved slots therein representative of the path of a radar ray in the atmosphere for the specific conditions encountered by the radar rays.

INVENTOR
DANIEL BARRON

PATENTED SEP 7 1971 3,602,995

INVENTOR
*DANIEL BARRON*

BY *Melvin L. Crane*
*Arthur J. Fleming* ATTORNEY 12,602,995

RADAR PROPAGATION RAY PLOTTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to templates and more particularly to an improved template aid for plotting the path of a radar ray in a gaseous medium.

One method for detecting and locating targets in the atmosphere embodies radar-equipped airplanes having a capability of flying at various altitudes. One of the most important functions of the radar operator is to determine how high to fly the airplane in order to obtain maximum search coverage. Obviously, the proper positioning of the radar projector will provide operational factors in which an airborne target will have the least chance of escaping detection.

In order to determine the proper tactics, for example, localization, search, or formation for the detection of airborne targets it is important that the radar operator know the estimated radar range (ERR) of the radar equipment when the same is operating at a particular height. The ERR is defined as the range which will give 50 percent probability of detecting a target.

It is known that the behavior of radar in the atmosphere and therefore the performance of radar equipment, is dependent upon the temperature and humidity conditions in the body of air in which the detection operation is taking place. The temperature condition in turn is dependent upon the height to which reference is being made, the pressure effect, density at this height, and humidity of the air at this height. Presently, radar operators either have the use of a radiosonde which automatically measures the air temperature and humidity as a function of height and provides a record which is called a radiosonde plot or alternatively, have previously obtained radiosonde profiles for the particular area over which the airplane is to operate.

Given the data from the radiosonde recorder or from the prior profiles, the operator subjectively chooses the height at which the radar projector is to be located and additionally subjectively estimates the range which is to be expected from the radar equipment's selected height. To aid in this subjective analysis, the operator may refer to charts and previous data, if available.

In the past, in order to obtain a visual picture of the search area, the paths of radar rays in the atmosphere were plotted by freehand, by conventional drafting curves, i.e., French curves, or by sophisticated electronic x-y plotters. These methods result in visual presentations which are too involved, too expensive or too time consuming for practical use.

SUMMARY OF THE INVENTION

This invention employs the use of ray plotting. In this invention an actual diagram gives a picture of the paths of radar in, above and below various ducting layers, the amount of refraction, reflection bounces from the surface, the inclination of the radar beams refracted downward, the null zone, the height of an initial contact for a particular range above the surface layer, and other information. The plotted ray path is that of the "limiting ray" which is the ray which bounds the area of search in the thermocline, and is the ray that is used for range prediction.

These problems are solved or minimized by the present novel ray plotter which enables the radar operator to rapidly obtain an accurate presentation of the area and volumetric coverage of the radar rays as they propagate through the atmosphere, and of the best height to place an airborne radar to obtain maximum search coverage. The plot can be used to predict ranges between the transmitter and the target for various atmospheric conditions and to determine the altitude of a target.

STATEMENT OF THE OBJECTS

It is therefore an object of the present invention to provide a radar ray plotter for plotting the path of radar rays from a radar projector.

Another object is to provide a drafting template for obtaining an accurate ray plot of the radar path in the atmosphere.

Still another object is to provide a template for obtaining a ray plot of the radar rays eminating from a source for various angles thereof and for various layer conditions, and temperature gradients.

Yet another object is to provide a radar ray plotter form making a plot for determining the best altitude to operate a transmitter in the detection of airborne targets.

A still further object is to provide a radar ray plotter for making a plot for determining the best altitude at which a search radar should be operated for the detection and localization of an airborne target and which will additionally provide information as to the range which may be expected from the radar when the same operates at the selected altitude.

Still another object is the provision of a lightweight, compact inexpensive radar ray plotter capable of quickly and accurately providing information as to the best altitude to operate a radar transmitter during the detection of airborne targets.

A further object is to provide a radar ray plotter for making a plot which will quickly and accurately provide information as to the best altitude to operate a radar during the location, detection and classification of airborne targets and to quickly and accurately provide information as to the range which may be expected to be obtained when the same is operated at that selected altitude.

An additional object is to provide a radar ray plotter which will quickly and accurately determine the height of an airborne target.

Various other objects and advantages will appear from the following description of an embodiment of the invention, and the novel features will be particularly pointed out hereinafter in connection with the appended claims.

Figure 1:
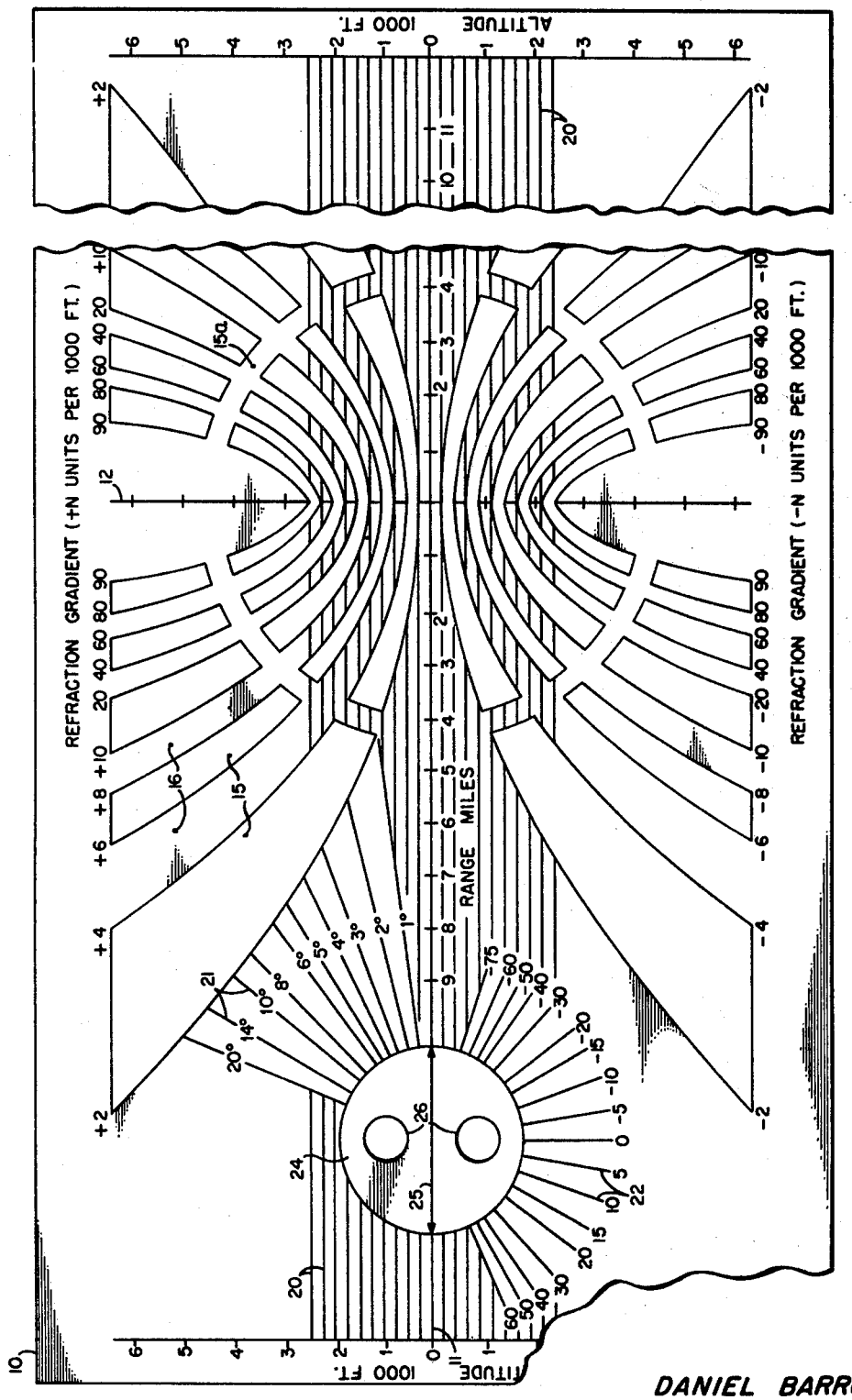
FIG. 1 illustrates a top view of the radar ray plotter.

In the illustrated embodiment of the invention and with particular reference to FIG. 1, there is shown a radar ray plotter or template 10 comprising a body made of a thin sheet of transparent plastic material such as "Plexiglass" or other similar material of which drafting instruments of the general nature are usually made.

The body 10 is divided into upper and lower portions by a horizontal range scale line 11 extending across the width thereof appropriately divided and marked in miles representative of range from the center outwardly in each direction. A vertical height scale line 12 passes through the zero mile indicator normal to the horizontal and divides the upper and lower portion into the quadrants and is appropriately marked in one thousand (1,000) foot units from the range scale line outwardly above and below representative of height. Each of the aforesaid divisions are additionally marked on the marginal edges of the body 10.

On body 10, a series of curves are plotted symmetrically about vertical height scale line 12 which represent the paths of radar rays through the atmosphere for various positive or negative index of refraction gradients (rate of change of radar velocity with altitude) here illustrated as 2, 4, 6, 8, 10, 20, 40, 60, 80 and 90. The curves represent the actual path of radar rays (radar beams) for rate of velocity change per 1,000 feet in the atmosphere and the rate is illustrated by numerals or indicia located on the body 10 at the terminus of each curve. Those curves positioned above the horizontal range scale line 11 are for positive refraction gradients while those curves positioned below the line 11 are for negative refraction gradients. The method utilized for plotting the constant gradient curves employs Snell's law which may be obtained from any standard text and other equations for propagation of radar rays which are well known and may be found in *Radio Meterology* by B. R. Bean and E. J. Dutton, Library of Congress No. 65-60033.

It should be understood that only representative gradient curves 2, 4, 6, 8, 10, 20, 40, 60, 80 and 90, refraction units are illustrated and that more or less curves could be provided without departing from the spirit of the invention.

In order to facilitate the drawing or plotting of the various curves by insertion of a pen, pencil point or similar instrument, the body 10 has excised portions or slots 15 formed between alternate pairs of curves. Circular ribs 15a of the body 10 interrupt the slots 15 at periodic intervals to provide structural support for the remaining curved members 16.

A series of horizontal lines 20 tangent to each of the refraction gradient curves at the apex thereof and parallel with the range line 11 is indicated on the body 10 and operate to facilitate the plotting, as will be discussed below.

The body 10 includes in the far left side a ray angle and gradient measuring device which is used to aid in drawing the ray lines. The angle-measuring lines 21 in the portion above mid-line 11 and the gradient value lines 22 are in the portion below the midline with a center point or aperture 23 on the midline through which an imaginary line from the angle-measuring lines and gradient lines extend. Each of the extending lines may have an aperture therein for receipt of a marking pen, pencil or some such instrument. The ray angle lines are spaced in regular intervals beginning at the horizontal line 11 which serves as the base line for measuring the beam width angle. The lines represent ray width angles from 0° to 20° as shown. The beam width angles on the template appear larger than the values indicated, however, it is to be understood that the graphical presentation of the angle is adjusted to compensate for an abscissa in miles and an ordinate in thousands of feet. The refraction gradient values both positive and negative extend from 0 to 60 opposite sides of the vertical line as shown.

A rotatable disc 24 is provided with the center coaxial with the aperture 23 and a diametrical line 25 which aligns with the midline 11. The disc 24 is provided with depressions 26 therein with which ones finger fits to rotate the disc. The diametrical line lines up with each of the ray angle width lines and the refraction gradient lines, extensions of these lines would pass through aperture 23 which corresponds to the midpoint of the disc.

Figure 2:
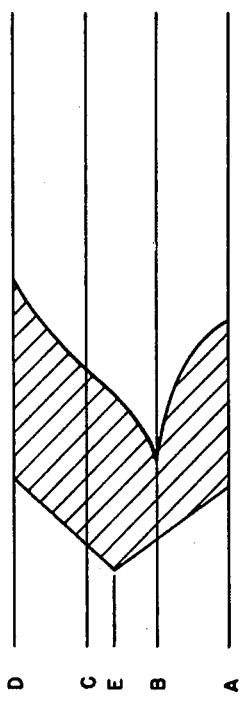
FIG. 2 is a typical plot, obtained through use of the ray plotter of radar rays for the atmospheric conditions illustrated (which is typical) for a search radar placed in the layer.

Referring now to FIG. 2, there is illustrated a typical ray plot obtained by the utilization of the novel radar ray plotter of the present invention. The plotter is normally used together with information obtained from a radiosonde to obtain the desired plot. On the situation of FIG. 2, the radiosonde profile provides a reading indicated at 40 which shows that a refracted layer exists between the surface A and altitude B, the refraction layer being a layer of air where there is a negative change in index of refraction with altitude. A similar negative refraction layer exists between altitude C and the altitude of the atmosphere and a positive refraction gradient layer, which is a positive rate of change of index of refraction with altitude, exist between altitude B and altitude C.

PLOTTING

In the actual plotting of the radar ray paths, horizontal lines are drawn on graph paper representing the earth surface A, the boundary of the negative layer B, the boundary of the next layer C, and the boundary of positive refraction layer D, in accordance with the information from the radiosonde profile. In the instance of FIG. 2, where the radar source or transmitter is placed in the surface negative layer at altitude E and it is desired to plot the limiting rays, the altitude location of the radar source is marked at "a" and the template 10 is placed so that the vertex of the −20 curve (commonly referred to as the negative refraction curve) touches the surface B at "b" and the curve passes through the mark "a." The curve is then traced and extends from transmitter mark "a" to the point "c" on surface A thereby providing arc "abc." In order to show the bounces that occur at the surface of the earth, the template 10 is moved over until the negative refraction −20 curve touches the vertex of the previously drawn curve or arc "abc." The curve or arc is then drawn. This is continued for as many bounces as is desired, always making sure that the tangent line 20 of the negative refraction curve is tangent to the vertex of the preceding curve or arc.

The curve or arc "ad," which is representative of one of the family of rays emanating from the source, is plotted by placing the negative refraction curve of the template 10 at the source mark "a" and tracing the curve until it intersects surface A, this occurring at point "d." The bounce from the earth surface A is drawn by then placing the negative reflection curve (−20) tangent to the vertex of the preceding curve or arc. In this instance the vertex is at the source mark "a."

In order to trace the lower and upper rays "am" and "af" respectively which are limited by the beam width of the particular transmitter selected, the opening 30 on the template 10 is placed on the transmitter mark "a" (while maintaining the template horizontally) and a mark is made by pencil point or the like at the aperture adjacent the beam width angle indicia, the beam width being a known characteristic of the sound source. A line is then drawn from the source mark "a" toward the beam width mark until the line intersects with surface A, as at "m," thereby providing curve "am." The template is then turned 180° and the above procedure repeated. This will provide curve "af."

The curve or arc "fg," a continuation of "af" is obtained by selecting the proper positive gradient curve (obtained from the radiosonde profile), holding the template in the horizontal position, matching up the negative gradient curve until it is tangent to arc "ef" at "f" and then drawing the arc "fg."

The arc "gh" which is a continuation of arc "fg" is obtained by using the negative refraction curve (−20) since the layer between surfaces C and D is a negative refraction layer. Holding the template in the horizontal position, the negative refraction curve is positioned tangent to arc "fg" at "g" and the arc "gh" is drawn until it intersects boundary D.

Next, to draw the limiting ray "bj" the proper positive gradient curve of the template is selected in accordance with the radiosonde profile indication and the template is positioned with the vertex of the selected negative gradient curve touching the surface B at point b. The arc "bj" is then drawn and terminates at boundary C.

The ray is continued into the next layer (negative refraction) by positioning the negative refraction curve tangent to arc "bj" at "j" and the arc "jk" is drawn until it intersects boundary D.

As may be viewed in FIG. 2, the search area is limited by the limiting rays and is shown crosshatched. The noncrosshatched areas indicates areas of weak or no ensonification thereby putting the operator or plotter on notice that a target in this area could escape detection.

Figure 3:
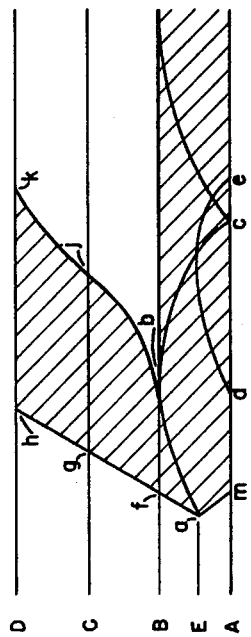
FIG. 3 is a typical schematic plot, obtained through use of the ray plotter of radar rays for a transmitter placed in the trapping layer.

Using basically the same technique as that described above, a plot of the radar rays can be obtained for the situation in which the transmitter is located in the positive gradient rather than in the negative gradient layer. Such a plot is shown at FIG. 3, a description of which is not considered necessary in view of the extended discussion above.

In combination with the ray-plotting curve template there is included an angle measuring an refraction gradient measuring device as shown on the left portion of the template.

In order to measure the refraction, the template is placed such placed such that the horizontal reference line passes through the refraction profile at the point at which it is desired to measure the gradient. The movable circular plate or disc with the diametrical line inscribed thereon is rotated until the line best coincides with the slope of the refraction profile line. The value of the refraction gradient will be the value at the arrow on the tip of the diametrical line on the rotatable circular member. Once the gradient has been determined the radar rays may be plotted as set forth above in the description previously explained.

In order to measure the value of the angle of the radar ray the template is positioned such that the horizontal reference line passes through the profile at the point at which the angle is desired. The circular element is rotated until the diametrical line lines up with the straight segment of the ray line. The angle is then read from the values on the template at the arrow on the top of the diametrical line.

It will be understood that various changes in the details, materials, steps and arrangements of parts which have been herein described and illustrated in order to explain the nature of the invention, be made by those skilled in the are without departing from the scope of the invention.

What is claimed and desired to be secured by letters Patent of the United States is:

1. A template for plotting the paths of radar rays emanating from a source and directed into a body of air in the atmosphere having a particular index of refraction range; comprising, a transparent body having flat parallel upper and lower surfaces, a plurality of corresponding spaced slots in the shape of curves formed in the upper and lower half of said body, each slot formed substantially the entire extent thereof by the contour of two separate curves, each on an opposite face of said slot with their vertex in vertical alignment, a numerical indicia correspondingly identifying a gradient value for each of said curves, said slots serving as guides for transferring the curve configuration to another surface, said curved faces of said slots being representative of the path of a radar ray in the body of air for a particular rate of change in the index of refraction of the body of air per unit of attitude, a vertically extending visible index scale marked on said body having scale graduations indicative of altitude, said index scale being in alignment with the verticies of said curves, a series of graduations marked on said body adjacent the marginal edge thereof corresponding to the graduations on the vertically extending visible index scale, a horizontally extending visible index scale line marked on said body along the midsection of said body between said shaped curves in the upper and lower halves of said body, a series of parallel horizontal lines tangent to said curves at their vertex and extending substantially the length of said body parallel with said baseline, an aperture formed in said body with the index scale line along a diameter thereof, a rotatable disc member secured within said aperture with a line thereon along a diameter thereof for alignment with said base line, a series of radiating angularly spaced visible lines on said body above and below said index line with each line directed toward the center of said disc within said disc within said aperture in said body, said angular spaced lines above the index line indicative of the beam width angle of the radar source with numerical indicia identifying the beam width angle of each of said lines with respect to the index line, and said angular spaced lines below said index line indicating different gradient lines with numerical indicia identifying the gradient values.